United States Patent Office 3,039,923
Patented June 19, 1962

3,039,923
XEROSIN AND PROCESS OF PREPARATION THEREOF
Vincent Groupé, Princeton, and Leonora H. Pugh, New Brunswick, N.J., and Alvin S. Levine, Brookline, Mass., assignors to Carter Products, Inc., New York, N.Y., a corporation of Maryland
Filed Nov. 20, 1956, Ser. No. 623,501
5 Claims. (Cl. 167—65)

The present invention relates to a microbial product, xerosin, which is active as an anti-inflammatory agent and is capable of beneficially affecting certain viral diseases, and a method of preparation of such product.

The present invention is a continuation-in-part of our prior and copending application Ser. No. 381,268, filed September 21, 1953, now abandoned, and entitled "Microbial Product Capable of Beneficially Affecting Certain Viral Diseases and Method of Preparation Thereof."

In the past, there has been considerable activity in the development of pharmaceutical, and chemotherapeutic preparations for the therapeutic treatment of various diseases, some of which are caused by microbes including the bacteria, rickettsiae and viruses. As far as is known, the effort has been, in substantially all cases, to provide a material usable or tolerated in the body of the animal or human, as the case may be, which will either kill the bacteria or virus (a bactericidal, or virucidal agent) or which will prevent the multiplication of the bacteria or virus (a bacteriostatic or virustatic agent) in some way in the body of the host. Many of the presently known chemotherapeutic agents such, for example, as the sulfa-drugs, penicillin and streptomycin are in this latter class of agents, i.e., these substances tend to prevent multiplication or reproduction of the living organisms which cause the disease in question, and hence permit the defense mechanisms of the host (such as phagacytosis and antibody formation) to rid itself of the parasites.

There is a theory, which is presently believed to be correct and which is supported by a progressively increasing volume of evidence, to the effect that the multiplication of viruses, per se is, in certain infections, independent of the progress of the disease or lesion itself. It is believed true that the inception of the disease in a host requires a certain threshold number or concentration of the infectious virus. However, once this threshold amount or concentration is reached and the disease or lesion has its inception, the number of virus particles may actually be on the decrease, while the disease continues to develop or increase, even to the point of causing the death of the host. For this reason, therefore, it is believed that the previously known antiviral agents, which act either as virucidal or virustatic agents, may be ineffective, per se, to accomplish a desired complete therapeutic treatment, at least in certain instances.

Xerosin is believed to be an answer to the need just pointed out, in that it is an anti-inflammatory agent which tends to reduce or suppress inflammation, or in some instances to reduce or suppress the growth of certain types of tumors as hereinafter set out in detail, even though xerosin does not itself serve to kill or even inhibit the growth of the bacteria or virus causing the lesions or inflammation. Xerosin has further proven effective in reducing or suppressing inflammation in instances where the inflammation was caused by purely chemical means in the absence of any bacteria or virus.

From another point of view, it now seems probable that lesions and/or inflammation may be caused either by the direct action of bacteria or virus or similar direct action of certain toxic chemical agents, or may be caused as a consequence of the reaction of the host to direct or indirect action of bacteria, virus, or toxic chemical agents. In any event, whatever be the cause of the lesions or inflammation or whatever be the mechanism by which it is brought into being, it is found that in the cases of many lesions and types of inflammation including for example, certain types of tumors as hereinafter set out, the action of xerosin in suppressing the growth or spread of such lesions, inflammation or tumors and in reducing or minimizing their undesirable character by general beneficially affecting them, has been proven and is a present known characteristic of xerosin. It has been shown that xerosin does not itself, apparently either directly or indirectly, kill or prevent the multiplication of either bacteria or virus as far as is known, notwithstanding its beneficial effect upon lesions and upon inflammation which may have been produced by the direct or indirect action of such bacteria or virus as aforesaid.

Summarizing the present invention, there is provided in accordance therewith a new composition of matter, now known as xerosin, which is effective as hereinafter noted as an anti-inflammatory agent and which is capable of beneficially affecting certain diseases or lesions due to the direct and/or indirect action of certain representative viruses as particularly hereinafter set forth. There is also presented herein a process and general teachings as to the manner in which this new material, xerosin, may be prepared, and, to some extent at least, refined or purified.

Considering briefly the characteristics of xerosin, it is a material, which is believed to be organic in character as distinguished from inorganic; which contains both nitrogen and phosphorous, each in the form of one or more of its compounds; which is not dialyzable against running water; which is quite soluble in water and also in dilute aqueous alkaline solutions; which is quite thermostable; which is substantially insoluble in many common organic solvents, such as ethanol; which is substantially ineffective in vitro against representative fungi, bacteria, bacteriophages and animal viruses; which is ineffective in vivo as a virucidal or virustatic agent; which responds as follows to certain color tests:

| | |
|---|---|
| Biuret | Positive |
| Anthrone | Positive |
| Iodine | Negative |
| Molisch's | Negative |
| Fehling's | Negative |
| Millon's reagent | Negative |
| Nitroprusside | Negative |
| Ninhydrin | Negative | which has a characteristic absorption pattern for ultraviolet light as hereinafter set forth; which is effective in vivo in suppressing the development of the disease or lesion in mice resulting from previous infection with any one of the following representative viruses:

Influenza A virus
Influenza B virus
Mouse pneumonitis virus (*Miyagawanella bronchopneumoniae*)
Newcastle disease virus (NDV)

which is effective in vivo in suppressing the development of the tumor or lesion in chickens infected with Rous sarcoma virus; and which is tolerated by the host under the circumstances and in the concentrations in which it is effective in suppressing disease or lesions as aforesaid.

The substance xerosin of the present invention may be prepared by a process, including cultivating a strain of *Achromobacter xerosis* No. 134 in an artificial complex nitrogenous liquid medium or broth in the presence of atmospheric oxygen, and precipitating crude xerosin from the liquid culture by acidifying it to a pH of about 2 to about 4, and preferably about 3.5, and further refining or purifying the crude xerosin thus precipitated by repeatedly redissolving the precipitate in a neutral or slightly alkaline medium and reprecipitating by acidification within the limits and/or in the preferred acid concentration hereinabove noted. If desired, a further purification procedure may be employed, including redissolving the material and reprecipitation thereof from 50% ethanol containing one percent sodium chloride, preferably, but not necessarily, in the cold, at about 6–9° C.

The present invention will be set forth in greater detail hereinafter as to each step of the preparation thereof, the tests which have been made of the material itself and its chemical and physical characteristics, and also, and particularly, its effect in suppressing the development of the disease or lesion itself. This subject matter will be better understood by reference to the accompanying drawings in which:

FIGURE 1 is a chart illustrating the ultraviolet absorption of xerosin plotted against the wave length (APM in FIGS. 1–10 is xerosin);

FIG. 2 is a composite chart indicating the development of pneumonia in mice, including an upper portion wherein the ordinates are in units of percent pneumonia, the values plotted being based in each instance upon the average of a number of visual observations; a lower portion wherein the ordinates are in units of the average weight of lungs; and in both portions, the abscissae are days after inoculation of the mice with virus; curve I in both lower and upper portions representing a control, and curve II in each portion representing the effect of daily injections of xerosin, beginning 1 hour after the instillation of NDV (Newcastle disease virus);

FIG. 3 is a composite chart similar to FIG. 2 described above, except that in each portion of the chart, curve I is the control; curve II represents the result of 2 daily injections of xerosin beginning 1 hour after instillation of NDV; and curve III shows the similar effects of daily injections of xerosin for 3 days;

FIG. 4 is a similar composite chart illustrating the effect of a daily administration of xerosin on the development of pneumonia, curve I in each instance being the control; curve II illustrating the effect of daily injections of xerosin, beginning 48 hours after the instillation of NDV; and curve III illustrating the effect of daily injections of xerosin beginning 1 hour after instillation of NDV;

FIG. 5 is a chart illustrating the infective titer of infected lung tissue, the ordinates representing the log of dilution down to the point where the diluted tissue will be effective only to infect one-half or 50% of the animals subjected thereto, while the abscissa is days after the inoculation; curve I representing the results aforesaid wherein xerosin is injected daily beginning 1 hour after instillation of NDV, and curve II being the control;

FIG. 6 is a chart of percent pneumonia based on data obtained as described in connection with FIG. 2, against the reciprocal of the dilution of NDV, curve I representing the control and curve II, the effect of daily injections of xerosin beginning 1 hour after the instillation of NDV;

FIG. 7 is a composite chart similar to FIG. 2, illustrating the effect of xerosin on mice infected with mouse pneumonitis virus, curve I represents the control and curve II illustrates the effect when xerosin is administered at the rate of 3 mg. per day, beginning the third day after infection;

FIG. 8 is a composite chart similar to FIG. 2, illustrating the effect of 1 mg./day xerosin alone administered subcutaneously, chlortetracycline alone and combined therapy using both xerosin and chlortetracycline, all tests being in mice, infected with mouse pneumonitis virus;

FIG. 9 is a composite chart similar to FIG. 8 above described, except that 3 mg. per day of xerosin were employed in the tests reported in this figure as contrasted with 1 mg. per day for the tests illustrated in FIG. 8; and FIG. 10 is a chart similar to FIGS. 8 and 9 except that in this case the ordinates are in the terms of cumulative percent mortality, while the abscissae is in the terms of days as in FIGS. 8 and 9, this figure illustrating the effect on mice infected with mouse pneumonitis virus, of the separate and combined use of xerosin and chloramphenicol.

In the detailed specification which follows, the subject matter will be considered under several headings for the convenience of the reader.

THE ORGANISM WHICH PRODUCES XEROSIN

The bacterium which is used to produce xersoin in accordance with the present invention was isolated from soil. This bacterium is known as *Achromobacter xerosis* No. 134. This species of bacterium is a new species, and has been named accordingly.

The bacteria or cells consist essentially of rods, usually about 0.5μ, by 2μ to 3μ in liquid cultures after twenty-four hours of incubation at 28° C. Cells as long as 10 to 25μ are not uncommon in similar cultures incubated for forty-eight to seventy-two hours. The cells are motile by means of peritrichous flagella. The cells occurred singly or in short chains. Capsule formation was not observed. Gram's reaction was negative. The cells or rods are non-acidfast, and non-spore-forming.

On nutrient agar colonies were formed measuring 1.0 to 1.5 mm. in diameter and were white or greyish white in appearance. The colonies were dry, membranous, circular with an even edge, low convex and were adherent to the surface of the agar. On prolonged incubation, the colonies became tan in color, somewhat granular, and radially wrinkled with a lobated edge.

The cultures grew well at temperatures of 28° and 37° C. Cultures of this bacterium may be grown so as to produce xerosin in liquid media containing complex nitrogenous materials, such, for example, as peptone. In stationary culturing xerosin was produced and a pellicle was formed in broth containing any of the following: peptone, proteose peptone, tryptose and tryptone.

This bacterium may also be cultured and grown in an agitated bath or a moving bath, except that under such conditions, no pellicle is formed. Gaseous oxygen is, however, required in all culturing methods, as the culture is aerobic and growth apparently does not occur in the absence of gaseous oxygen.

The culture of the *Achromobacter xerosis* No. 134 may also be grown, but without producing xerosin or anything equivalent thereto, in media including inorganic nitrogen, such as an aqueous solution of dibasic ammonium phosphate [$(NH_4)_2HPO_4$] as the sole source of nitrogen. This bacterium will grow, but will not produce an acid reaction, in nutrient broth containing the sugars: glucose, galactose or maltose. On the other hand, on a dibasic ammonium phosphate-base agar, an acid reaction was produced when the medium contained glucose, galactose or maltose as the sole source of carbon. There was some growth without production of an acid reaction on agar containing sucrose as the sole source of carbon. There was no growth on agar containing lactose, arabinose, sorbitol, xylose, rhamnose, salicin, mannitol, or raffinose as the sole source of carbon. There was no growth on initial transfer to inorganic nitrogen base agar containing 50 mg. per 100 ml. of phenol.

The growth of this bacterium on other differential media is as follows:

(*a*) Litmus milk became alkaline and litmus was reduced after 7 days' incubation.
(*b*) Starch was hydrolyzed.
(*c*) Gelatin was liquified.
(*d*) Indol was not produced from tryptophane.
(*e*) Citrate was utilized as the sole source of carbon.

(f) Some hydrogen sulfide was produced after 7 days of incubation.

(g) Growth on potato was yellowish to brownish and appeared dry and wrinkled.

A culture of *Achromobacter xerosis* No. 134 has been deposited in the culture collection of the Institute of Microbiology of Rutgers, the State University, New Brunswick, New Jersey, under the number, 134.

THE PREPARATION OF XEROSIN

Considered broadly, xerosin is produced by culturing the producing bacterium described above, i.e., *Achromobacter xerosis*, No. 134; then filtering the culture medium (a step usually needed at this stage, although it may be replaced by a step involving separation of undesired solids at some later stage); then precipitating the crude xerosin from the filtrate by adjusting the pH of the filtrate to a value from about 2 to about 4, and preferably about 3.5; then purifying the crude xerosin by repeated solution in an aqueous medium having a pH greater than about 4 and reprecipitation by adjusting the pH of the resulting solution to an acid condition of about 2 to about 4 and again preferably about 3.50.

The culture medium in which the producing bacterium, *Achromobacter xerosis* No. 134, is placed to grow and to produce xerosin should contain some complex nitrogenous medium, such as peptone. On the other hand, peptone, per se is not required, nor is the character of the medium restricted to any small number of different materials. As aforesaid, the bacteria may be cultured in a stationary medium to produce a pellicle, wherein the nutrient medium comprises a broth containing peptone, tryptose, or tryptone. Other media, usually protein-containing in nature, such as proteose peptone, or other broths formed from meat, generally containing complex nitrogenous materials, such as protein, may be used as the culture medium. Vegetable proteins or analogous materials may also serve as the culture medium. In fact, there are so many things which could be used, only a relatively few of which have been experimented with, that the composition of the culture medium should not be considered as a narrowly critical factor from any point of view.

One specific culture medium, which has been found to be not only fully operative, but also desirable in the culturing of this bacterium in the production of xerosin, has the following particular composition:

| | Percent |
|---|---|
| Glucose | 0.25 |
| Yeast extract | 0.1 |
| Peptone | 1.0 |
| Beef extract | 0.5 |
| Distilled or tap water | Balance |

The pH of this solution was adjusted, when necessary to the range of 7.0 to 7.2 prior to using the culture medium.

It is possible, as hereinafter more particularly set forth, to culture this bacterium so as to produce xerosin in a number of different ways, including: (a) stationary culturing, and (b) submerged cultures with agitation, the latter being more applicable to large scale production. There will be set forth herein certain detailed instructions for static or stationary culturing of the bacteria in question and some information will be included applicable to the other types.

In culturing, it may be desirable to prepare an inoculum pool from an actively growing culture of *Achromobacter xerosis* No. 134 in a culture medium, having the particular composition listed above, after 24 hours of incubation at 28° C. To this is added 20% sterile inactivated horse serum, before distribution of the resulting material into a suitable number of vials. These vials are then stored at −70° C. until used or may be dried from the frozen state.

It has been found that agar slants of *Achromobacter xerosis* No. 134 were found to lose their viability after 7–14 days' storage in the refrigerator. However, in each of several experiments, frequently transferred broth (of the composition listed above) cultures were stable at refrigerator temperatures and xerosin production was always satisfactory and occasionally was greater. Frozen inocula were employed only as a convenience and to avoid possible variation or lysogenicity in the culture. Lysogenicity has never been observed here.

Blake bottles, each containing 250 ml. of sterile nutrient medium, the composition of which was listed above, were each inoculated with 5 ml. of seed, this seed consisting of the third serial transfer from the frozen inoculum, the preparation of which is described above. A smear of the seed was examined microscopically before each transfer. The inoculated Blake bottles were incubated horizontally for 3 days at 28° C. A surface pellicle was formed by the second day and the final reaction of the medium was pH about 7.5 to about 8.5.

Xerosin has also been prepared using shaken or submerged cultures, which were incubated for 72 hours at 28° C. It seems probable that somewhat shorter periods of incubation would also be effective. In any event, care must be taken, irrespective of the mode of culture, to assure that the culture has access to gaseous oxygen. One way of accomplishing this in the Blake bottles is to have the bottles closed with an air-pervious closure, such as non-absorbent cotton. In large scale operations, air may be caused to bubble up through the culture medium during the incubation period, thereby simultaneously effecting both aeration and agitation.

Returning now to the method of culturing the bacterium in question on a static basis and the subsequent procedure to recover xerosin therefrom and to purify the crude xerosin recovered, it is found that a pellicle is formed by the second day of the incubation. This pellicle is preferably removed by filtering the culture products through a suitable filter medium such as gauze or glass wool, the pellicle (which consists entirely of bacterial cells) being discarded. The filtrate is then acidified with concentrated HCl to a pH of about 2 to about 4, and preferably about 3.5. The crude xerosin, which is precipitated, is allowed to settle by gravity and/or may be separated from the supernatant liquor, either by decantation or filtration. It has been found desirable at this stage of the process to remove the supernatant liquor by suction, using a water pump. The precipitate of crude xerosin may then be repeatedly dissolved and reprecipitated, for example, in each instance, by dissolving the precipitate in about 15 volumes of distilled water, neutralized to a pH of 7–10 with 5 N NaOH.

The cycle of precipitation by acid, subsequent dilution and neutralization may be repeated any desired number of times. For example, three such additional times have been found to be satisfactory for many purposes. On the fourth dilution, 3 volumes of distilled water were added and the solution was adjusted to pH 9.0–9.5. This solution was clarified by centrifugation using a Sharples super centrifuge (24,000 r.p.m. at a slow rate of flow). The sediment was discarded and the supernate (effluent) was diluted with 5 volumes of distilled water and again acidified with HCl to pH 3.50 to precipitate xerosin. After the precipitate settled by gravity, the supernate was discarded, and a final dilution of 3–5 volumes of distilled water and acidification to pH 3.50 was carried out. The final precipitate was neutralized (pH 7.0–7.5) in a minimal volume of distilled water and was then dried from the frozen state. Xerosin was stored in a desiccator under vacuum. This method has been found to yield 100–200 mg. of xerosin per liter of the original culture filtrate treated.

It has been found that the best results in precipitating xerosin and in the settling of the precipitate are attained at a pH of about 3.50. It has also been found that xerosin is substantially insoluble in an aqueous solution having a pH from about 2 to about 4. This pH range is, therefore, to be considered fully operative throughout with the preferred value, particularly for the re-precipitations at a pH of about 3.50.

When the culturing is effected in a shaken culture, the same methods generally described above, may be employed with the following changes:

(1) Preliminary filtration through gauze for removing the pellicle which is produced during static culturing, is unnecessary;

(2) An additional clarification by centrifugation may be introduced after neutralization of the first acid precipitate. At this stage the volume to be centrifuged was about $\frac{1}{10}$ that of the original culture.

The xerosin material produced and purified as above set forth may, if desired, be further purified, without apparent loss of any active principal or ingredient of the xerosin, but with improved results as to potency and lack of toxicity by a precipitation following those above described in 50% ethanol containing about 1% sodium chloride. This precipitation is preferably, but not necessarily, carried out at a relatively low temperature (under refrigeration) at about 6 to 9° C. The purified xerosin thus produced is a white solid, which is highly soluble in water, and which has characteristics which will be described in the succeeding section.

The following comments may be made in respect to the various phases of the process or method of preparing xerosin as above described:

(1) Transfers of actively growing cultures were carried out before the formation of a pellicle e.g., 24 hours.

(2) Precipitation was most effective at pH 3.50. At this pH the precipitate settled out rapidly by gravity. Slight variations in pH were sometimes necessary if the precipitated xerosin tended to float.

(3) The time required for sedimentation of the precipitate ranged from 30 to 40 minutes on the first acidification of the culture filtrate, but progressively decreased on each additional precipitation.

PHYSICAL AND CHEMICAL PROPERTIES OF XEROSIN

Xerosin, as above set forth, is a substantially white solid material which, due to its being dried by evaporation from a frozen slurry, has a low bulk density. In a somewhat impure form, it may be light tan in color. This material is very soluble in distilled water as well as being soluble in dilute alkaline aqueous solutions. It is also reasonably soluble (e.g., 1 mg. per ml.) in physiological saline.

Xerosin is substantially insoluble in many common organic solvents such, for example, as ethanol, n-butanol, anesthetic ether, chloroform, petroleum ether, ethyl acetate, benzene and acetone. The potency of xerosin in aqueous solution (distilled water) is apparently not affected by any of the following: (a) exposure at 100° C. at either pH 6 or pH 9 for five minutes; (b) exposure in an autoclave at 120° C. for twenty minutes; (c) exposure to liquid ethylene oxide for one hour at 5° C.; (d) precipitation with 90% ethanol; (e) dialysis against running tap water for 24 hours; (f) precipitation from aqueous solution by half saturation with ammonium sulfate; or (g) precipitation from aqueous solution by addition of about 9 volumes of ethanol.

Various lots of xerosin have been analyzed chemically to determine the nitrogen and phosphorus content thereof. The average of these determinations show a nitrogen content of about 10% by weight (based on xerosin corrected to a zero moisture content) and phosphorus content of about 2% by weight. There is apparently a zero sulphur content as far as can be determined.

While it is not known whether xerosin is one single chemical compound or a mixture of two or more chemical compounds, the percentage of nitrogen and phosphorus therein plus its reaction to certain color tests as hereinafter noted would seem to indicate that it may consist of or contain a material of polypeptide character. It is also possible that this material xerosin may consist of or contain some matter similar to nucleic acid.

Figure 1:
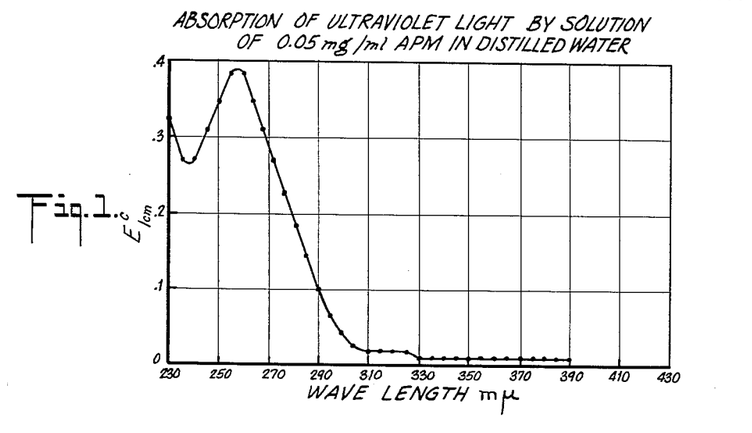

The material (xerosin) has been tested as to its absorption of ultraviolet light. The results of these tests are shown in FIG. 1, wherein a peak at 255–260 mu is positively shown.

The following is a report of the exposure of a number of the samples of xerosin, each made as aforesaid, to various color tests:

(1) Fehling's solution or Benedict's reagent: None of the samples tested gave any significant reduction.

(2) Molisch's reagent: Solutions of some samples of xerosin gave very faint violet rings with traces of green coloration in the sulfuric acid. The test was interpreted as negative.

(3) Anthrone test: Addition of the concentrated acid and anthrone resulted in an immediate and typical color change indicating the presence of carbohydrate, which was apparently tightly held since the Molisch test (see 2 above) was essentially negative.

(4) Millon's reagent: This reagent caused precipitation of the material. This test was essentially negative, although phenolic residues may be present.

(5) Nitroprusside test (cysteine): This reagent gave no coloration with any of the samples tested. The absence of sulfur was shown by combustion.

(6) When various samples were tested with $I_2$ solution, no coloration was observed.

(7) Ninhydrin reagent: The results were negative with all samples tested.

(8) Biuret test: Each of a number of samples gave positive tests.

(9) A sample of xerosin was hydrolyzed with HCl and the resulting solution run on a one dimensional paper chromatogram. A number of ninhydrin-positive spots were observed in confirmation of the positive biuret test (see 8 above).

After preparation, this material (xerosin) may be stored at room temperature or at some lower temperature, but, because the xerosin is slightly hygroscopic it is preferably stored in a desiccator under vacuum.

BIOLOGICAL AND THERAPEUTIC PROPERTIES AND TESTS OF XEROSIN

The xerosin, which was subjected to numerous tests in accordance with this section of the present specification, was made in accordance with the methods hereinabove described and was purified through at least four reprecipitations in acid aqueous solution as hereinabove explained. This material has been tested in a considerable number of different ways which are hereinafter described.

When tested in vitro, no evidence of antibacterial or antifungal activity could be demonstrated when the streak-dilution method was employed. A concentration of 5 mg. of xerosin per ml. in nutrient agar did not inhibit the growth of Escherichia coli, Micrococcus pyogenes var. aureus, Pseudomonas aeruginosa, Shigella sonnei, Bacillus cereus, Bacillus subtilis, Mycobacterium tuberculosis (strain 607), Streptomyces griseus, Streptomyces fradiae, Candida albicans, Aspergillus niger or Penicillium notatum.

Xerosin and the culture filtrate from which it can be precipitated were further tested in vitro against influenza A and B viruses (separate tests). These particular tests related to the failure of the xerosin to inhibit hemagglutination (agglutination of chicken red blood cells by influenza virus). The test was carried out in the following manner: Infected allantoic fluids were titrated in the usual manner in the presence of culture filtrate, xerosin (2 mg. per ml.), broth and saline, respectively. The hemagglutinin-test material mixtures were incubated for one hour at 36° C. before the addition of chicken erythrocytes. Identical end points were obtained in each of the various titrations with influenza A and B viruses, respectively.

In a further test, no evidence of inactivation of Newcastle disease virus (NDV) in vitro could be demonstrated when the virus was titrated in the presence of saline, culture filtrate, or xerosin, respectively, before inoculation into embryonated eggs.

Considerable time and effort were spent in attempting to demonstrate antiviral activity against influenza A virus in embryonated eggs both in vitro and in vivo using both culture filtrate and xerosin. Suppressive effects, though regularly observed, were minimal. The various preparations were rendered suitable for injection into eggs by the addition of penicillin (500 units per ml.) and neomycin (200 units per ml.). Control inocula were similarly treated. The results of several typical experiments are summarized in Table I which follows:

*Table I*

EFFECT OF CULTURE FILTRATE AND XEROSIN ON INFLUENZA A VIRUS IN EGGS

| Type of test | Test material | Result | |
|---|---|---|---|
| | | I/T | Avg. hemagglutinin titer |
| Contact | Control | 10/11 | [1] 626 |
| | Culture filtrate | 9/11 | 380 |
| Therapeutic | Control | 13/14 | 731 |
| | Culture filtrate | 11/16 | 270 |
| Protection | Control | 14/15 | 955 |
| | Culture filtrate | 12/14 | 340 |
| Contact | Control | 7/7 | 1,473 |
| | 2.5 mg. xerosin [2] | 4/4 | 840 |
| | 1.25 | 7/8 | 740 |

[1] Reciprocal of avg. hemagglutinin titer of allantoic fluid collected 49 hrs after infection with 10–100 ID$_{50}$. (ID$_{50}$ is the infectious dose which will infect 50% of the animals exposed thereto or inoculated therewith. 10 ID$_{50}$ is 10 times this infectious dose, etc.)
[2] Sterilized with ethylene oxide.

NOTE.—Contact test equals test material mixed in vitro with virus and incubated 1 hr. at room temperature before inoculation. Therapeutic test equals test material injected 1 hr. after infection. Protection test equals test material injected 1 hr. before injection. I/T equals the number of mice infected over the total number.

The data indicate that culture filtrate known to be effective in suppressing the development of pulmonary lesions in mice, was, at best, capable of effecting a slight (approximately 2-fold) reduction in the average hemagglutinin titer of allantoic fluid collected 48 hours after infection with 10–100 ID$_{50}$ of influenza A virus. However, this slight reduction in the formation of viral hemagglutinin was obtained whether the culture filtrate was mixed in vitro with the virus or was injected one hour before or one hour after infection. It was hoped that xerosin would prove to be more effective than culture filtrate. However, this was not the case. A solution of xerosin containing 5 mg. per ml. was sterilized with ethylene oxide, and was tested for antiviral activity by means of the contact test. As with culture filtrate a slight (approximately 2-fold) reduction in viral hemagglutinin was obtained. Attempts to demonstrate a reduction in the infective titer of allantoic fluid collected 24 hours after inoculation were unsuccessful. The eggs received potent culture filtrate one hour after infection with 10 ID$_{50}$ of virus. It was concluded that the embryonated egg was not a suitable host for the demonstration or detection of antiviral activity of xerosin against influenza A virus when the usual methods were employed.

Many tests were conducted using white mice as the host and using various viruses. The first series of tests in this group hereinafter set forth all used influenza A virus.

Data from two typical experiments illustrating the suppressive effect of xerosin on the development of pneumonia in mice infected with influenza A virus are presented in Table II which follows:

*Table II*

SUPPRESSIVE EFFECT OF XEROSIN ON PULMONARY LESIONS IN MICE INFECTED WITH INFLUENZA A VIRUS

| Mg. xerosin injected SC on day | | | Result—3rd day after infection [1] | | | |
|---|---|---|---|---|---|---|
| | | | I/T | Lesion score | | Avg. weight lungs, g. |
| 0 | 1 | 2 | | L/M | % | |
| 0 | 0 | 0 | 21/22 | 48/105 | 46 | |
| 9 | 9 | 9 | 6/12 | 4/60 | 7 | |
| 3 | 3 | 3 | 12/12 | 8/60 | 13 | |
| 1 | 1 | 1 | 6/10 | 5/60 | 10 | |
| .3 | .3 | .3 | 10/12 | 10/60 | 17 | |
| .1 | .1 | .1 | 11/12 | 21/60 | 35 | |
| | | | [2] 0/6 | | | .18 |
| 0 | 0 | 0 | 15/15 | 53/75 | 71 | .33 |
| 3 | 3 | 3 | 5/12 | 7/60 | 12 | .22 |
| 0 | 3 | 3 | 12/12 | 20/60 | 33 | .22 |
| 3 | 0 | 3 | 12/12 | 28/60 | 47 | .24 |
| 0 | 0 | 3 | 11/12 | 19/60 | 32 | .25 |
| 0 | 3 | 0 | 10/12 | 20/60 | 33 | .23 |
| 3 | 0 | 0 | 8/12 | 14/60 | 23 | .24 |

[1] Approximately 10,000 ID$_{50}$.
[2] Uninfected controls.

NOTE.—SC=subcutaneously. I/T=Number of mice infected/total L/M=Total lesion score/total max. score. %=L÷M×100.
Lesion score: ½=<5% lung tissue consolidated; 1=5–25%; 2=26–50%; 3=51–75%; 4=76–100%; 5=dead mouse with lungs consolidated.

Groups of 12 or more mice each were infected intranasally with approximately 10,000 ID$_{50}$ of influenza A virus and injections of xerosin were begun one hour or more after infection as indicated. All mice were sacrificed on the 3rd day after infection and the degree of pulmonary consolidation and average weight of the lungs were recorded. The data indicate that (a) daily injections of xerosin were the most effective, (b) a delay of 24 hours in the time of treatment or a reduction in the number of injections of xerosin reduced its effectiveness, (c) a suppressive effect was still demonstrable when only one injection of xerosin was given 48 hours after infection, and (d) daily injection of as little as 0.3 mg. of xerosin exerted a detectable suppressive effect on the development of pulmonary lesions. It is of interest in this connection to recall that the infective titer of lung tissue has been shown to be maximal 24 hours after infection with low dilutions of influenza A virus.

Comparative studies on the relative effectiveness of xerosin administered by various routes were carried out in similar experiments with influenza A virus. The data obtained indicated that intraperitoneal injection of xerosin was also effective, but was toxic, and that oral administration of 4 mg. per day of xerosin was without effect. It has been determined that xerosin is relatively non-toxic for mice; and that in 10–12 gram mice, the maximum tolerated dose (LD$_0$) is about 800 mg. per kilogram subcutaneously, 400 mg./kg. intraperitoneally and 200 mg./kg. intravenously. Inasmuch as xerosin is not effective when administered orally, the maximum tolerated dose for oral administration has not been determined. As compared with these figures, however, the average effective dose in mice are daily injections of 50–150 mg. per kilogram of body weight. At this level, it is believed that a considerable excess is being administered and is apparently far below the toxic level.

Intranasal instillation of xerosin virus mixtures was also found to be ineffective in the following experiment: One ml. amounts of serial decimal dilutions of influenza A virus were mixed in vitro with an equal volume of saline containing 3 mg. of xerosin per ml. respectively, and incubated for one hour at room temperature before inoculation into groups of 5 mice each day by the intranasal route. The mice were observed for a period of 10 days and dead mice and mice still living on the 10th day after inoculation were examined and the degree of typical pulmonary consolidation was recorded. The end points ($ID_{50}$) of the 2 titrations were identical ($10^{-7.3}$), clearly indicating that xerosin was not virucidal for influenza A virus.

The term "titrations," as used herein, indicates the degree of dilution of the infectious material down to the point of the so-called end point, i.e., where the dilution is such as to infect only 50% of the animals to which a material in this degree of dilution is administered. It is usually expressed as a negative power of 10.

It was of interest to determine whether xerosin was more effective when mice were infected with a much smaller quantity of influenza A virus. In the experiment summarized in Table III, shown below, groups of 20 mice each were infected with a sublethal dose [10 $ID_{50}$] of virus and were injected daily, subcutaneously with 1 and 3 mg. of xerosin, respectively, beginning one hour after infection.

Table III

EFFECT OF XEROSIN ON DEGREE OF PULMONARY CONSOLIDATION IN MICE INFECTED WITH SUBLETHAL DOSE OF INFLUENZA A VIRUS

| Xerosin | Result—10th day after infection,[1] lesion score | | |
|---|---|---|---|
| | I/T | L/M | % |
| Control | 17/20 | 34/100 | 34 |
| 1 mg. SC×10 | 5/20 | 9/100 | 9 |
| 3 mg. SC×10 | 6/19 | 6/95 | 6 |

[1] 10 $ID_{50}$.

Twenty similarly infected, but untreated, mice served as the control group. All mice were sacrificed on the 10th day after infection and the degree of pulmonary consolidation was noted. The data indicate that daily injections of xerosin definitely suppressed the development of pulmonary lesions in mice infected with a sublethal dose of influenza A virus. However, it would appear that the effectiveness of xerosin in suppressing the development of pneumonia was not markedly increased when the size of the infecting dose of virus was greatly (1,000×) reduced (Table II).

It was of obvious importance to study the effect of xerosin on the rate of death of mice infected with a lethal dose of influenza A virus. The results of a typical experiment are summarized in Table IV which follows:

Table IV

EFFECT OF XEROSIN ON RATE OF DEATH OF MICE INFECTED WITH 10,000 $ID_{50}$ OF INFLUENZA A VIRUS

| Xerosin dose/day | I/T | Cumulative percent mortality on day— | | | | | |
|---|---|---|---|---|---|---|---|
| | | 2 | 3 | 4 | 5 | 6 | 7 |
| Control | 19/20 | 0 | 15 | 45 | 80 | 85 | 95 |
| 1 mg. SC | 20/20 | 0 | 0 | 20 | 50 | 95 | 95 |
| 3 mg. SC | 20/20 | 0 | 0 | 0 | 25 | 60 | 95 |

This experiment was identical with the preceding one except that a lethal dose of virus (10,000 $ID_{50}$) was employed. The data show that daily injections of 3 mg. of xerosin delayed death of the mice by approximately 2 days and that when the daily dose of xerosin injected was decreased to 1 mg., the delay in death was reduced.

A series of tests substantially similar to those above described and herein reported as to influenza A virus in the mouse were also carried out using influenza B virus in the mouse. The results were substantially the same as those hereinabove reported as to influenza A virus. For this reason, these particular data are not included herein.

The tests reported above, which were carried out using influenza A virus and influenza B virus, related to the use of a virus capable of multiplying, both in its inherent character and also in view of the portion of the host in which these viruses were introduced. Under these circumstances, a relatively small amount of virus will be capable in most instances of inducing the disease or lesion in question due to the progressive multiplication of the virus, raising the concentration thereof up to the threshold concentration characteristic of the particular host-virus relationship. When that threshold concentration obtains, in accordance with the present theory, the disease or lesion begins to develop. This lesion is suppressed, as hereinabove set forth, by the action of xerosin. However, when the virus is of the kind and/or in such location that it can multiply and continues to multiply in the host, the effect of xerosin may be only temporary if used alone, as the continued multiplication of the virus and increasing concentration thereof tends to offset the beneficial effect of xerosin after a time. It has been found that the effect of xerosin will suppress the lesion and retard its development for a period of about 48 to about 72 hours.

There are some viruses which produce disease, however, which when introduced in low dilution into certain hosts are not capable of multiplication, such as Newcastle disease virus (hereinafter referred to as NDV) which is inherently incapable of multiplication to any substantial extent in mice. Also, properly classified in this general category, are viruses which are inherently capable of multiplication in the host, but are introduced in such a portion of the host that viral multiplication does not occur. This will be treated more in detail hereinafter.

It has been shown that the non-transmissible pneumonia in mice, which follows intranasal inoculation of NDV, paralleled the reactions between virus and host cell, save that formation of new infectious particles did not occur. Further, when the maximum of pneumonia was observed, there remained less than 0.1% of the original NDV inoculum. This unique host-virus relationship was found to be affected by xerosin in the experiments described below.

A large number of mice were inoculated intranasally with 0.1 ml. of undiluted allantoic fluid containing $10^9$ infectious units of NDV. Beginning one hour after inoculation and daily thereafter groups of 15 mice each were injected subcutaneously with various amount of xerosin as indicated in Table V which follows:

Table V

EFFECT OF XEROSIN ON DEVELOPMENT OF PNEUMONIA INDUCED BY NEWCASTLE DISEASE VIRUS IN MICE

| erosin | Result—3rd day after inoc.[1] | | | |
|---|---|---|---|---|
| | I/T | Lesion score | | Avg. weight lungs, g. |
| | | L/M | % | |
| Control | [2] 0/4 | 100/150 | 67 | .18 |
| | 30/30 | | | .27 |
| 1 mg. SC×3 | 12/15 | 20/75 | 27 | .21 |
| .3 | 13/15 | 20/75 | 27 | .22 |
| .1 | 14/15 | 19/75 | 25 | .22 |
| .03 | 10/15 | 18/75 | 24 | .23 |
| .01 | 12/15 | 34/75 | 45 | .25 |

[1] $10^9$ $ID_{50}$. [2] Uninoculated controls.

Inoculated but otherwise untreated mice served as controls. All mice were sacrificed on the 3rd day after inoculation (at the time of maximum pneumonia) and the degree of pulmonary consolidation and the average weight of the lungs were recorded. It is clear from the data that daily injection of as little as 0.03 mg. of xerosin suppressed but did not wholly prevent the development of pneumonia.

In another extended series of tests, NDV was used as the virus and the mouse as the host in each instance. The particular manner of testing was as follows: Large numbers of albino mice weighing 18 to 20 g. each were inoculated intranasally under light ether anesthesia with 0.1 ml. of undiluted allantoic fluid containing $10^9$ $ID_{50}$ of NDV. After inoculation of NDV the mice were distributed at random into identical cages, 6 to 8 mice per cage. The cages were previously marked as control mice or as mice to be injected with xerosin and with the scheduled date of sacrifice and examination. Injections of xerosin were made subcutaneously under the loose skin on the backs of the mice. Groups of 10 to 15 mice each were sacrificed at appropriate daily intervals and the lesion score and average weight of the lungs (weight of petri dish plus 10 lungs less weight of dish after removal of lungs, divided by 10) were recorded.

Figure 2:
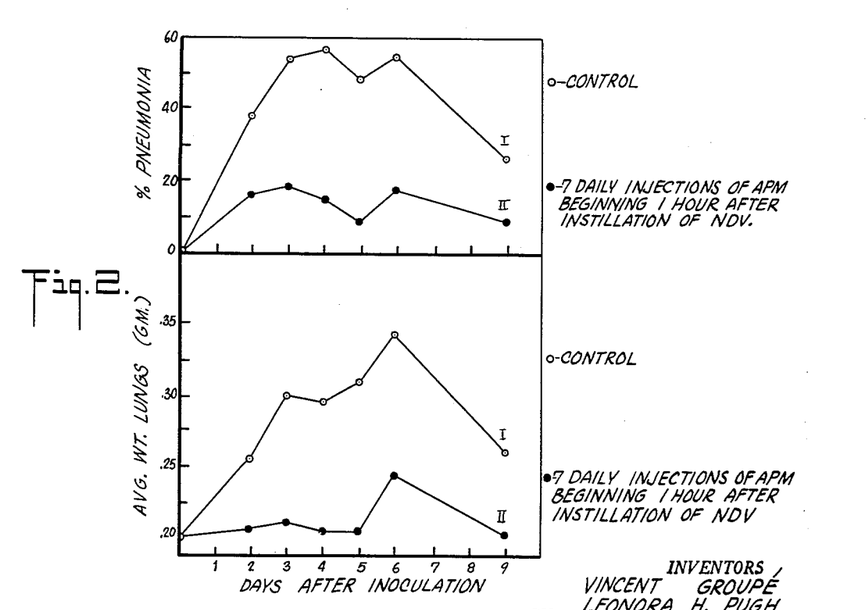

Suppression of pneumonia was readily effected by daily injections of xerosin. Large numbers of mice were inoculated intranasally with NDV. One half of these received daily subcutaneous injections of 1.0 mg. amounts of xerosin beginning 1 hour after inoculation with NDV. The remaining mice served as controls. Twelve to 15 mice from each group were sacrificed daily for 6 days and on the 9th day after inoculation. The lesion score, expressed as percent pneumonia, and average weight of the lungs were determined as described. The results are presented graphically in FIG. 2. As expected, the maximum of pneumonia was reached in the control group (curve I) on the third day after inoculation with NDV and severe pneumonia continued for three additional days. By the ninth day after inoculation, however, resolution of the pneumonia was well underway. It is evident (curve II) that the pneumonia was considerably reduced in those mice which received seven daily injections of xerosin.

Figure 3:
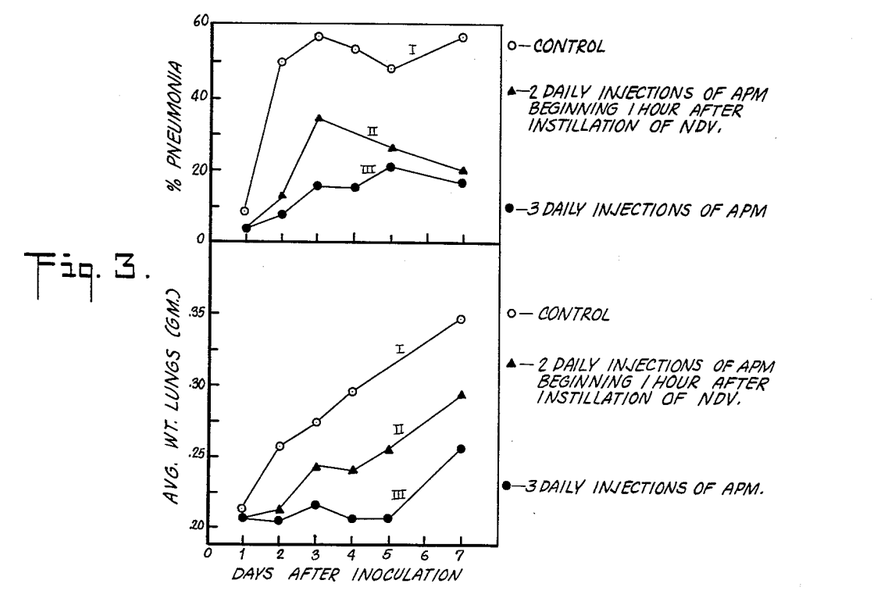

When daily injections of xerosin were discontinued after the second injection, pneumonia continued to develop. In this experiment, 17 groups of 12 mice each were inoculated with NDV. Six of these groups were set aside and served as controls. The remaining mice received 2 daily injections of 1.0 mg. amounts of xerosin beginning 1 hour after inoculation with NDV. Of these, 5 groups of 12 mice each received one additional injection of xerosin on the following day (i.e., the second day after inoculation with NDV). Appropriate groups of 12 mice each were sacrificed at daily intervals and the lesion score and average weight of the lungs were recorded. The data, presented in FIG. 3, show that if daily injections of xerosin were discontinued during the period of rapid extension of the lesion, pneumonia continued to develop.

Figure 4:
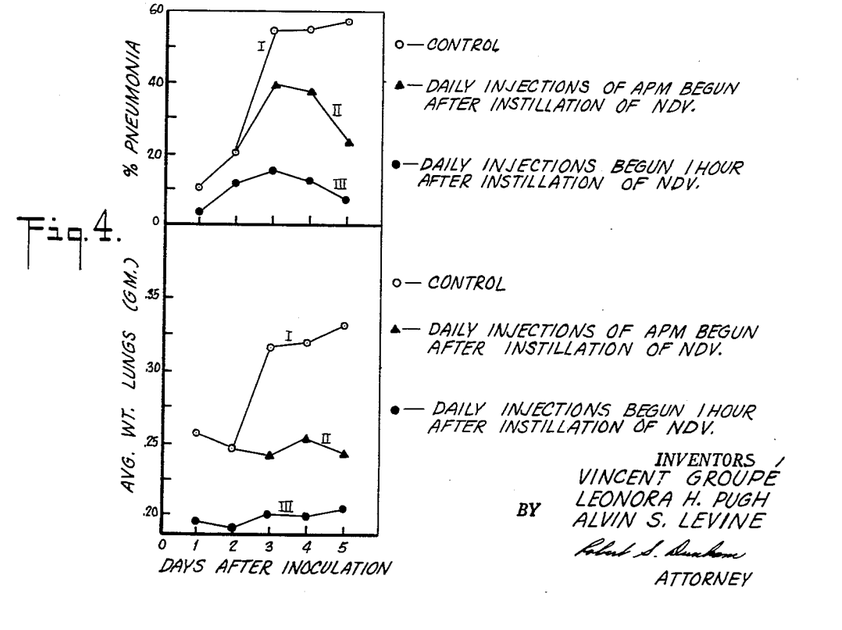

When injections of xerosin were delayed until 48 hours after inoculation with NDV, the development of pneumonia was arrested. Large numbers of mice were inoculated with NDV and then separated into 13 groups of 12 mice each. Five of these groups were set aside as controls and an equal number received daily injections of 1.0 mg. amounts for five days, beginning 1 hour after inoculation. In the three remaining groups, daily injections of xerosin were not begun until 48 hours after instillation of NDV. Appropriate groups of mice were sacrificed daily and the lesion score and average weight of the lungs were noted. The data are summarized in FIG. 4 and show that daily injections of xerosin could be delayed for as long as 48 hours after inoculation with NDV and still arrest the development of pneumonia.

However, when daily injections of xerosin were delayed until the time of maximal pneumonia, i.e., 72 hours after inoculation with NDV, xerosin was without substantial effect. In this experiment, as before, large numbers of mice were inoculated intranasally with NDV. One group of 19 mice was sacrificed on the third day after inoculation and the lesion score and average weight of lungs were recorded. A second group of 24 mice received daily injections of 1.0 mg. amounts of xerosin beginning on the third day after inoculation. A third group of 22 mice served as controls. On the 7th day after inoculation with NDV, mice in the second and third groups were sacrificed and examined. The data are presented in Table VI, which follows:

Table VI

FAILURE OF XEROSIN TO AFFECT RESOLUTION OF PNEUMONIA IN MICE

| Days after inoculation of NDV [1] | I/T | Lesion score | | I/T | Xerosin lesion score | |
|---|---|---|---|---|---|---|
| | | L/M | % | | L/M | % |
| 3 [2] | 19/19 | 63/95 | 66 | | | |
| 7 | 22/24 | 56/120 | 47 | 20/22 | 52/110 | 47 |

[1] $10^9$ $ID_{50}$ intranasally.
[2] 1 mg. amounts of xerosin injected subcutaneously daily beginning on the 3rd day after inoculation of NDV.

NOTE.—L/T=Number infected/total. L/M=Total lesion score/total maximum lesion score. %=L÷M×100.
Lesion score: ½=<5% lung tissue consolidated; 1=5–25%; 2=26–50%; 3=51–75%; 4=76–100%; 5=dead mouse with lungs consolidated.

It will be seen that xerosin was without substantial effect when daily injections were delayed for 72 hours and that it did not affect resolution of pneumonia. Thus, it would appear that xerosin is effective only during the period of rapid extension of the lesion or disease.

Figure 5:
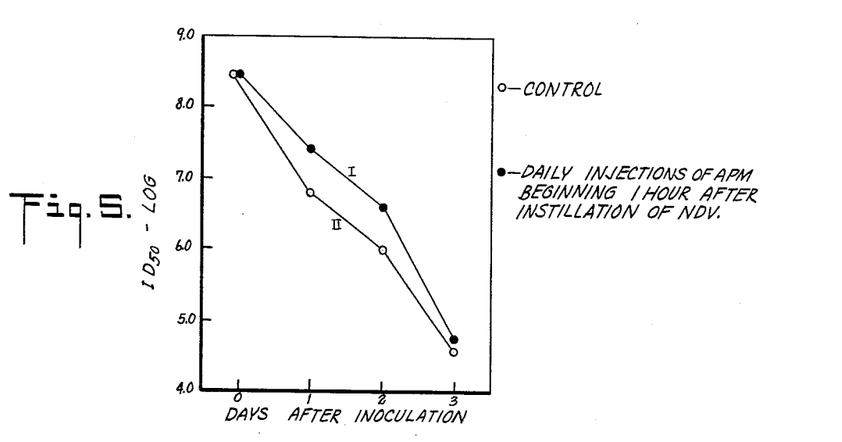

Daily injections of xerosin failed to alter appreciably the infective titer of lung tissue. Eighty mice were inoculated intranasally with $10^9$ $ID_{50}$ of NDV. One hour after inoculation 40 mice were injected subcutaneously with 1.0 mg. amounts of xerosin and daily thereafter for two days. An equal number were set aside as controls. Ten mice from each group were sacrificed 2, 24, 48 and 72 hours, respectively, after inoculation. Lungs from the respective groups were pooled and stored at $-70°$ C. Five to eight days later the various pools of lung tissue were thawed, 10% suspensions of lung tissue were prepared by grinding lungs from each subgroup in a mortar with sterile sand, and infectivity titrations were carried out in embryonated eggs as previously described. The results are shown in FIG. 5. As expected, the infective titer of lung tissue from the control group (curve II) decreased from $10^{-8.4}$ when removed 2 hours after inoculation to $10^{-4.6}$ on the third day after inoculation. Daily injections of xerosin, which definitely suppressed the development of pneumonia, failed to affect appreciably the infective titer of lung tissue (curve I).

Figure 6:
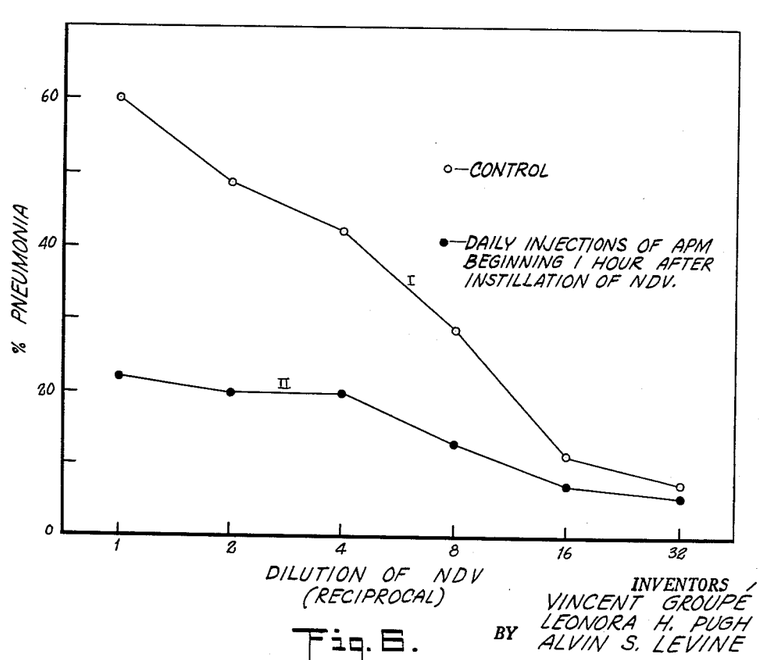

Curiously, dilution of the inoculum of NDV did not increase the effectiveness of xerosin in suppressing development of pneumonia. In fact, the data indicate an apparent reduction in effectiveness of xerosin against limiting dilutions of NDV in the experiment described below. Serial 2-fold dilutions of NDV were inoculated intranasally into 6 groups of 40 mice each. One hour later half of the mice in each group were separated and these mice were injected with 1.0 mg. amounts of xerosin at that time and daily thereafter for two days. The remaining mice in each group served as controls. On the third day after inoculation with NDV, when the maximum of pneumonia was attained with all dilutions of NDV, the mice were sacrificed and the lesion scores were recorded. The results are shown in FIG. 6. It will be seen (a) that the effectiveness of xerosin was not increased when the amount of NDV inoculated was decreased; and (b) that xerosin had little effect on pneumonia induced by limiting dilutions of NDV.

When influenza A virus (a virus inherently capable of growth when introduced into portions of the body (i.e., the lungs) of the mouse wherein such growth is permitted) is injected intracerebrally, no substantial viral multiplication occurs. The virus of influenza A, then, is, in effect, in the same category as NDV. Under these circumstances, a representative number of mice were inoculated with influenza A virus and then given daily injections of xerosin substantially in the same way as hereinabove described in connection with tests on NDV. It was found that the daily injections of xerosin substantially delayed and decreased mortality following intracerebral inoculation of influenza A virus.

Figure 7:
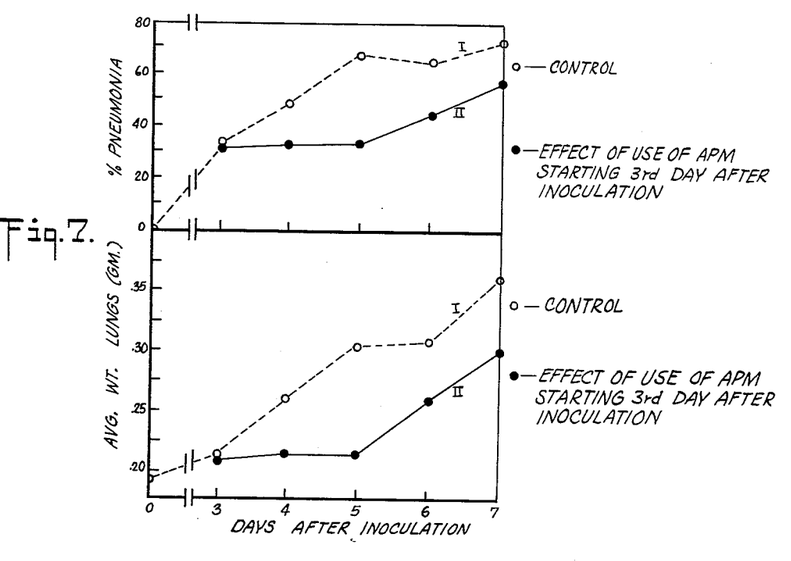

Tests have also been made in a manner similar to those previously described herein with mouse pneumonitis virus (*Miyagawanella bronchopneumoniae*). Xerosin was found to suppress the development of pneumonia in mice previously infected with this virus. The mode of action paralleled closely that previously described for influenza A virus. In addition it was found that, as in the case of influenza A, xerosin did not exert an antiviral effect per se (that is, xerosin did not inactivate the virus in vitro nor did it suppress viral multiplication in vivo); despite this, the development of pneumonia was markedly suppressed. This subject matter is illustrated in FIG. 7, which plots the data in the same manner as hereinabove explained in connection with FIGS. 2 to 4 inclusive.

As above set forth, when a virus is of a kind which is inherently capable of multiplication, but is in such a portion of a body of a host as not to be capable of multiplication under the circumstances, there is still a possible effect on the host of a sufficient (threshold amount) concentration of the virus, by reason of the toxicity thereof. An example of this is influenza A virus injected intracerebrally into mice. The modifying effect of xerosin on the neurotoxicity of influenza A virus for mice has been investigated with the following results: In general this effect of xerosin parallelled the effect previously described for the suppressive effect of xerosin on the non-transmissible pneumonia in mice induced by Newcastle disease virus (NDV). As in the latter case, the influenza A virus does not propagate appreciably, if at all, when injected intracerebrally into mice. However, daily injections of xerosin substantially delayed and decreased mortality following intracerebral injection of influenza A virus.

Tests were made of the effect of daily injections of xerosin on the tuberculin reaction in guinea pigs. The animals were actively sensitized with 0.5 ml. of tubercle bacilli in oil injected subcutaneously 3–5 weeks before the test. Five control and five treated animals each were tested by injecting intradermally 0.1 ml. of tuberculin diluted 1/10, 1/31.6, and 1/100. The diameters of the areas of induration and erythema at the sites of injection were observed and measured 24 and 48 hours later. It was found that xerosin markedly reduced the size of the tuberculin reactions in sensitive guinea pigs. Necrosis was also diminished or absent in these reactions.

Further tests were made of the effect of xerosin as an anti-inflammatory agent in cases where inflammation was caused by purely chemical means and no virus or bacteria were present or involved. For this test the effect of xerosin was observed on guinea pigs' skin with respect to the necrotic lesions produced by injections of pure turpentine. In these tests five control and five treated animals were each injected intradermally with 0.05, 0.02, and 0.01 ml. of turpentine and the diameters of the areas of induration were measured 24 and 48 hours later. Xerosin reduced considerably the size of the reactions. The area of necrosis in control lesions was hemorrhagic, contracting, and sloughing; while in the animals treated with xerosin, the lesion remained bland, yellow, and uncontracted.

Tests have also been made of the effect of xerosin in suppressing tumor development in chickens, following inoculation with Rous' sarcoma virus. In these tests, daily injections of xerosin prolonged the period of incubation (that is, time from infection to day of first appearance of tumor). In addition, xerosin was found to modify the gross appearance of the tumor in certain instances. Further, mortality of the chickens was delayed.

Tests have shown, for example, that when Rous' sarcoma virus is injected in relatively low concentrations into chicken wings, the tumors resulting therefrom may be beneficially affected by daily injections of xerosin, whether those daily injections are started prior to the introduction of the Rous' sarcoma virus into the chickens or thereafter and upon the initial observation of a resulting tumor 3 mm. or more in diameter. It was found, for example, that when chickens with established tumors were treated with xerosin, a very large proportion of the tumors developed an atypical appearance as compared with typical tumors. In this respect these two types of tumors are distinguishable as follows: Typical tumors were soft, grew rapidly, and were grossly invasive; while the xerosin-induced atypical tumors were hard, sharply circumscribed, and grew slowly.

It was found that there was a striking similarity between the gross appearance of the atypical tumors induced by xerosin and those induced by a similar application to the host of hydrocortisone. However, the latter promptly reverted to typical invasive tumors when the application of hydrocortisone was discontinued; while atypical tumors induced by xerosin continued to grow slowly, but none reverted to the typical grossly invasive type of tumor. As a further distinction between the effects of the use of xerosin and hydrocortisone, it was found that when injections of hydrocortisone were begun after inoculation of the chickens with Rous' sarcoma virus, the tumors were not only typical, but also grew even more rapidly than control tumors.

Further, comparing the effects of the use of xerosin and cortisone (and/or a derivative of the latter, as hydrocortisone) it has been found that in treating influenza virus infections in mice, injections of xerosin are helpful, whereas injections of cortisone produce positive undesirable effects. As to viral toxicity (instances where the virus is introduced into an animal so that it does not grow or multiply, but still causes a lesion), injections of xerosin are helpful, whereas injections of cortisone have no appreciable effect. In the case of inflammations produced by chemicals, for example, turpentine or by bacterial endotoxins (for example, lipopolysaccharide) injections of xerosin and cortisone are both helpful.

It has been shown above by a large number of tests on a considerable number of different representative viruses that xerosin is effective in suppressing the disease or lesion, due to or initiated by the presence in the host of the virus in question. It has also been explained generally that there is a growing body of evidence tending to show that the action of xerosin is selective on the disease or lesion, while this material is ineffective as an antiviral agent, either as a virucidal or as a virustatic agent. As such, where a virus continues to multiply, the effect of xerosin is transient or temporary, delaying the progress of the lesion for perhaps 48 to 72 hours. It will be noted that where the virus is progressively multiplying and where xerosin can give a delaying action only, there is incomplete and inadequate therapy.

Figure 8:
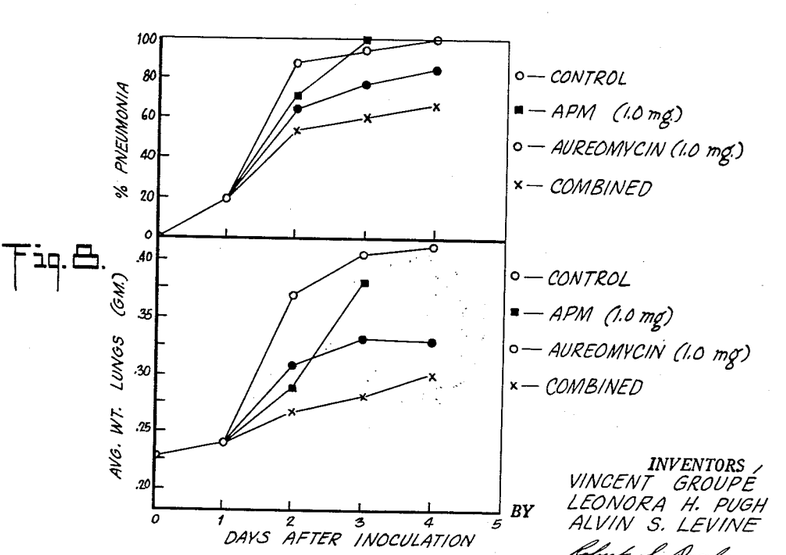
Figure 9:
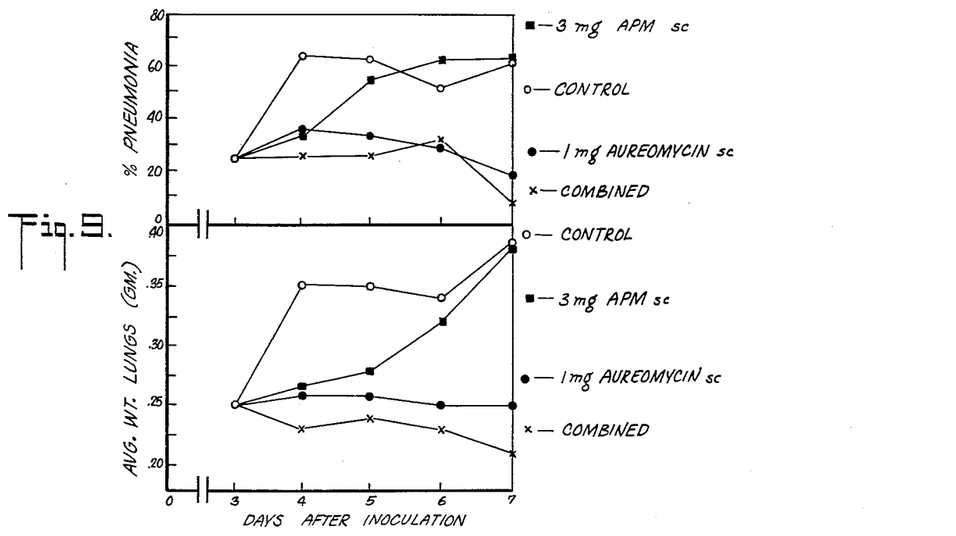
Figure 10:
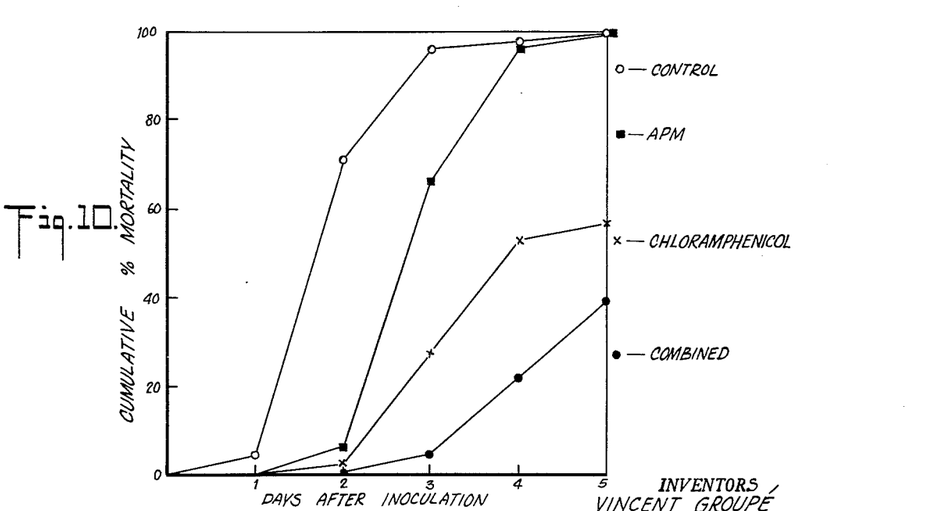

What is, of course, desired is that the host shall recover promptly and completely from the disease in question. This recovery may in some instances require the joint function of two or more agents in instances where virus continues to multiply: first, something must be administered to retard or suppress the disease, inflammation, or lesion—such as xerosin, and second, in those instances where viral multiplication continues unabated throughout disease, it is also desirable to inhibit such viral multiplication. Based upon this reasoning, tests have been made using xerosin jointly with previously known antibiotics which also inhibit the multiplication of rickettsiae and certain larger viruses of the psittacosis group, and particularly with such antibiotics as chlortetracycline and oxytetracycline and also with chloramphenicol, all of which have a virustatic effect against mouse pneumonitis virus. The action of these jointly administered therapeutic agents and their several independent results, when used on mice infected with mouse pneumonitis virus, is illustrated in FIGS. 8, 9 and 10. The therapeutic agents and the xerosin where used were, in each instance, injected parenterally and the tests conducted in substantially the same manner as has been more particularly described hereinabove. It will be noted that the conjoint effect of these agents is, in many instances, to save the life of the animal, which otherwise die under the conditions of the test. It is believed that this is a new and useful result based upon this combined therapy, which could not be attained by any one agent alone.

While it has been demonstrated that xerosin is effective in suppressing disease or lesions resulting from the action of certain viruses in certain of the smaller laboratory animals (the mouse and the chicken, respectively), no reason is presently known why this novel material xerosin herein described will not effect similar results in some of the larger animals and perhaps also in human beings. Furthermore, while the present knowledge in regard to xerosin is still somewhat limited, research work in respect thereto is progressing and continuing, so that further detailed information will become available as the work progresses. The present disclosure embodies substantially all the information available to date in respect to this material, its method of preparation and its uses. Based upon the disclosure herein given, those skilled in the art could, and presumably will, be enabled to visualize equivalents of certain of the procedures and of the substances herein particularly described. All such matter, reasonably equivalent to that particularly disclosed herein, should be considered as a part of the present invention which is measured by the appended claims, which are to be construed validly as broadly as the state of the prior art permits.

What is claimed is:

1. A microbial product, xerosin, which is active as an anti-inflammatory agent and is capable of beneficially affecting certain viral diseases; which is organic and contains nitrogen and phosphorus in compound form; which is not dialyzable against running water; which is soluble in water (pH=7) and in alkaline aqueous liquids; which is thermostable; which is substantially insoluble in ethanol, n-butanol, anesthetic ether, chloroform, petroleum ether, ethyl acetate, benzene, and acetone; which responds as follows to certain color tests.

| Test: | Response |
|---|---|
| Biuret | Positive |
| Anthrone | Positive |
| Iodine | Negative |
| Molisch's | Negative |
| Fehling's | Negative |
| Millon's reagent | Negative |
| Nitroprusside | Negative |
| Ninhydrin | Negative | which has an ultraviolet absorption pattern substantially as shown in FIG. 1, with a peak at about 255–260 mu; which is substantially ineffective as a virucidal agent in vitro or as a virustatic agent in vivo; which is effective in vivo in supressing the development of lesions in mice previously inoculated with any one of the following viruses:

Influenza A virus
Influenza B virus
Mouse pneumonitis virus (*Miyagawanella bronchopneumoniae*)
Newcastle disease virus and in vivo in suppressing the development of the tumor in chickens previously infected with Rous' sarcoma virus; which is tolerated in said mice and chickens respectively in the concentrations required to suppress the lesions resulting from the actions of the respective viruses aforesaid; which is distinguished from cortisone and hydrocortisone in that it produces desirable results in use in connection with influenza virus infections in mice and virus-induced Rous' sarcoma tumors in chickens, wherein such results do not ensue from the similar use of cortisone and hydrocortisone, and also has a beneficial effect on lesions resulting from viral toxicity in mice, wherein cortisone is ineffective; and which is also effective in reducing inflamation induced by purely chemical means and wherein neither virus nor bacteria are present as a cause of the inflammation; and which is derived from the cultivation of a strain of *Achromobacter xerosis* No. 134, and occurs in a crude state in the precipitate from the culture medium of said *Achromobacter xerosis* No. 134 precipitated by adjusting the pH thereof to a value from about 2 to about 4, and said crude xerosin being purified by repeated solution in an aqueous liquid and reprecipitation by adjusting the pH of such liquid to an acid condition of about 2 to about 4.

2. The method of producing xerosin, comprising the steps of culturing *Achromobacter xerosis* No. 134, a strain of which is deposited in the culture collection of the Institute of Microbiology of Rutgers, the State University, New Brunswick, New Jersey, precipitating crude xerosin from the liquid culture by adjusting the pH thereof to a value from about 2 to about 4, and purifying said crude xerosin by repeated solution in an aqueous medium having a pH greater than about 4 and reprecipitation by adjusting the pH of the resulting solution to an acid condition of about 2 to about 4.

3. The method of producing xerosin according to claim 2, in which the culturing step is effected with the liquid culture stationary and substantially without agitation, a pellicle being formed during the culturing step, and the pellicle-forming material being eliminated from said culture medium by a filtering step immediately following the culturing step and prior to the initial precipitation of said crude xerosin.

4. The method of producing xerosin according to claim 2, in which said purifying step is effected by a reprecipitation of the xerosin by adjusting the pH of each said resulting solution to about 3.5.

5. The method of producing xerosin according to claim 2, in which both the initial precipitation of said crude xerosin and the repeated reprecipitations included in said purification step are effected by adjusting the pH of the respective solutions to about 3.5.

References Cited in the file of this patent

UNITED STATES PATENTS 2,239,345   Sperti _______________ Apr. 22, 1941

FOREIGN PATENTS 505,256   Belgium _______________ Aug. 31, 1951

OTHER REFERENCES

Groupé et al.: J. Bact., vol. 68, pp. 10–18, 1954.
Groupé et al.: P.S.E.B.M., vol. 8, pp. 710, 1952.
Ginsberg: Fed. Proc., vol. 13, p. 494, 1954.
Groupé et al.: J. Immunology, vol. 74, p. 249, 1955.
Ricks et al.: Science, Dec. 3, 1948, pp. 634, 635.
Karel: Dictionary of Antibiotics, page 4, publ. 1951, Columbia University Press, New York City.
Todd: J. Pharm. and Pharm., October 1955, pp. 625–641.